(12) United States Patent
Bordawekar et al.

(10) Patent No.: US 11,948,056 B2
(45) Date of Patent: Apr. 2, 2024

(54) COMMUNICATION-EFFICIENT DATA PARALLEL ENSEMBLE BOOSTING

(71) Applicant: International Business Machines Corporation, Armonk, NY (US)

(72) Inventors: Rajesh Bordawekar, Westchester, NY (US); Tin Kam Ho, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 17/114,644

(22) Filed: Dec. 8, 2020

(65) Prior Publication Data

US 2022/0180253 A1 Jun. 9, 2022

(51) Int. Cl.
  *G06N 20/20* (2019.01)
  *G06F 9/52* (2006.01)
  *G06N 5/01* (2023.01)

(52) U.S. Cl.
  CPC .............. *G06N 20/20* (2019.01); *G06F 9/52* (2013.01); *G06N 5/01* (2023.01)

(58) Field of Classification Search
  CPC ............. G06N 20/20; G06N 5/01; G06F 9/52
  See application file for complete search history.

(56) References Cited

U.S. PATENT DOCUMENTS

| 6,662,170 | B1 | 12/2003 | Dom et al. |
| 8,694,444 | B2 | 4/2014 | Faddoul et al. |
| 9,508,347 | B2 | 11/2016 | Wang et al. |
| 9,684,870 | B2 | 6/2017 | Fawaz et al. |
| 11,526,811 | B1 * | 12/2022 | Wu .......................... G06F 18/21 |
| 2009/0125155 | A1 | 5/2009 | Hill et al. |

(Continued)

FOREIGN PATENT DOCUMENTS

| CN | 105654210 A | 6/2016 |
| WO | 2020018279 A1 | 1/2020 |

OTHER PUBLICATIONS

Alsabti; "Clouds: A Decision Tree Classifier for Large Datasets"; Proceedings of the 4th Knowledge Discovery and Data; 1998; 7p.

(Continued)

*Primary Examiner* — David E Choi
(74) *Attorney, Agent, or Firm* — CANTOR COLBURN LLP; Jared Chaney

(57) ABSTRACT

Data-parallel ensemble training using gradient boosted trees includes training an ensemble of trees. The training includes splitting a training dataset into several data portions. Each data portion is assigned to each thread group from a set of thread groups. The training further includes executing a stage, in which each thread group, in parallel, trains a respective ensemble of decision trees. Executing the stage includes performing, by each thread group, in parallel, machine learning operations for the respective ensemble of decision trees using the data portion assigned to each thread group. Further, each thread group validates, in parallel, the respective ensemble of decision trees using a data portion assigned to another thread group. Execution of the stage is repeated until a predetermined threshold is satisfied. Further, a prediction is inferenced using the ensemble of decision trees that is formed using the respective ensemble of trees from each of the thread groups.

17 Claims, 8 Drawing Sheets

(56) References Cited

U.S. PATENT DOCUMENTS

| | | | |
|---|---|---|---|
| 2020/0026999 A1 | 1/2020 | Wang et al. | |
| 2020/0074707 A1* | 3/2020 | Lee | G06T 7/30 |
| 2020/0082269 A1* | 3/2020 | Gao | G06F 7/483 |
| 2020/0202622 A1* | 6/2020 | Gallo | G06T 15/10 |
| 2020/0226461 A1* | 7/2020 | Heinrich | G06N 3/082 |
| 2022/0259667 A1* | 8/2022 | Kurtz | G16B 40/20 |

OTHER PUBLICATIONS

Chen; "XGBoost: A Scalable Tree Boosting System"; KDD '16, Aug. 13-17, 2016, ACM. ISBN; 10p.

Ke; "LightGBM: A Highly Efficient Gradient Boosting Decision Tree"; 31st Conference on Neural Information Processing Systems (NIPS 2017), Long Beach, CA, USA; 9 p.

Li; McRank: "Learning to Rank Using Multiple Classification and Gradient Boosting"; Advances in neural information processing systems, 2007; 8p.

Mehta, "SLIQ: A Fast Scalable Classifier for Data Mining"; International Conference on Extending Database Technology; 1996; 15p.

Meng; "A Communication-Efficient Parallel Algorithm for Decision Tree"; 30th Conference on Neural Information Processing Systems (NIPS 2016); 9 p.

Shafer, "SPRINT: A Scalable Parallel Classifier for Data Mining"; Proceedings of the 22nd VLDB Conference Mumbai (Bombay), India, 1996; 12p.

Zhang; "GPU-acceleration for Large-scale Tree Boosting"; https://arxiv.org/pdf/1706.08359.pdf; 2016; 3 p.

\* cited by examiner

COMMUNICATION-EFFICIENT DATA PARALLEL ENSEMBLE BOOSTING

BACKGROUND

The present invention generally relates to programmable computers, and more specifically, to improving the performance of gradient boosted trees (GBT) in machine learning algorithms by using communication-efficient data parallel ensemble boosting.

"Ensemble methods" are one type of machine learning technique. Ensemble methods are typically used in a multimodal system in which different classifiers are strategically combined into a predictive model. In statistics and machine learning, ensemble methods use multiple learning algorithms to obtain better predictive performance than could be obtained from any of the constituent learning algorithms alone. Ensemble methods reduce variance in the predicted data and minimize biases in the predictive model.

GBT is a machine learning technique for regression and classification problems, which produces a prediction model in the form of an ensemble of base prediction models, which are decision trees. It builds the model in a stage-wise fashion like other boosting methods do, and it generalizes them by allowing optimization of an arbitrary differentiable loss function. Gradient boosting combines base learners into a single strong learner in an iterative training process that forces the later built base learners to make up for errors made by earlier built base learners. However, GBT is computationally expensive, which is a technical challenge when implementing GBT.

Some existing implementations of GBT support parallel implementations for building decision trees. However, in such parallel implementation, every iteration builds only one tree per sample of the entire dataset. Data parallel and feature parallel implementation suffer from I/O and communication costs (each tree build requires a collective reduction operation). Therefore, there is a need to improve the implementation of GBT and by improving the computing technology used for such implementation and improving the performance of GBT.

SUMMARY

According to one or more embodiments of the present invention, a computer-implemented method for data-parallel ensemble training using gradient boosted trees is described. The computer-implemented method includes training, using a machine learning device, an ensemble of trees using gradient boosted trees. The training includes splitting a training dataset into several data portions. The data portion is assigned to each thread group from a set of thread groups. The training further includes executing a stage in which each thread group, in parallel, trains a respective ensemble of decision trees. Executing the stage includes performing, by each thread group, in parallel, machine learning operations for the respective ensemble of decision trees using the data portion assigned to each thread group, respectively. Executing the stage further includes validating, by each thread group, in parallel, the respective ensemble of decision trees using a data portion assigned to another thread group. Execution of the stage is repeated until a predetermined threshold is satisfied. Further, the method includes inferencing, by the machine learning device, a prediction using the ensemble of decision trees that comprises the respective ensemble of trees from each of the thread groups.

According to one or more embodiments of the present invention, a system includes a memory having computer readable instructions and one or more processors for executing the computer readable instructions, the computer readable instructions controlling the one or more processors to perform data-parallel ensemble training for gradient boosted trees. The method includes training an ensemble of trees using gradient boosted trees. The training includes splitting a training dataset into several data portions. The data portion is assigned to each thread group from a set of thread groups. The training further includes executing a stage, in which each thread group, in parallel, trains a respective ensemble of decision trees. Executing the stage includes performing, by each thread group, in parallel, machine learning operations for the respective ensemble of decision trees using the data portion assigned to each thread group, respectively. Executing the stage further includes validating, by each thread group, in parallel, the respective ensemble of decision trees using a data portion assigned to another thread group. Execution of the stage is repeated until a predetermined threshold is satisfied. Further, the method includes inferencing a prediction using the ensemble of decision trees that comprises the respective ensemble of trees from each of the thread groups.

A computer program product includes a computer readable storage medium having program instructions embodied therewith, the program instructions executable by one or more processors to cause the one or more processors to perform data-parallel ensemble building for gradient boosted trees. The method includes training an ensemble of trees using gradient boosted trees. The training includes splitting a training dataset into several data portions. The data portion is assigned to each thread group from a set of thread groups. The training further includes executing a stage, in which each thread group, in parallel, trains a respective ensemble of decision trees. Executing the stage includes performing, by each thread group, in parallel, machine learning operations for the respective ensemble of decision trees using the data portion assigned to each thread group, respectively. Executing the stage further includes validating, by each thread group, in parallel, the respective ensemble of decision trees using a data portion assigned to another thread group. Execution of the stage is repeated until a predetermined threshold is satisfied. Further, the method includes inferencing a prediction using the ensemble of decision trees that comprises the respective ensemble of trees from each of the thread groups.

Other embodiments of the present invention implement features of the above-described method in computer systems and computer program products.

Embodiments of the present invention improve GBT implementation and accordingly provide an improvement to computing technology in a practical application. Advantages of the parallelized implementation of the GBT according to one or more embodiments of the present invention include parallelizing data reading. Further, each thread group operates on a smaller dataset by splitting the dataset into data portions, which results in requiring fewer operations for generating the final ensemble of trees. Further, the communication between thread groups is a point-to-point data transfer, unlike collective communication required in the traditional data parallel implementation. The amount of data communicated in a point-to-point data transfer is smaller than in collective communication. Therefore, such a point-to-point data transfer facilitates faster execution of the parallelized GBT according to one or more embodiments of the present invention.

Embodiments of the present invention are hardware agnostic and can be implemented using any type of parallel programmable hardware such as CPU, GPU, etc., or a combination thereof.

Additionally, each thread group processes the entire dataset, but in a different order, giving each thread group coverage over the entire dataset. Also, the final ensemble of decision trees (150) includes groups of trees that are distinct from each other by the order they leverage the data partitions and hence has a greater diversity in structure compared to the ensemble of trees generated and validated using the same dataset as a whole.

Embodiments of the present invention, accordingly, improve the GBT implementation by providing I/O and compute parallelism, coverage over the entire dataset, and diversity in structure.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
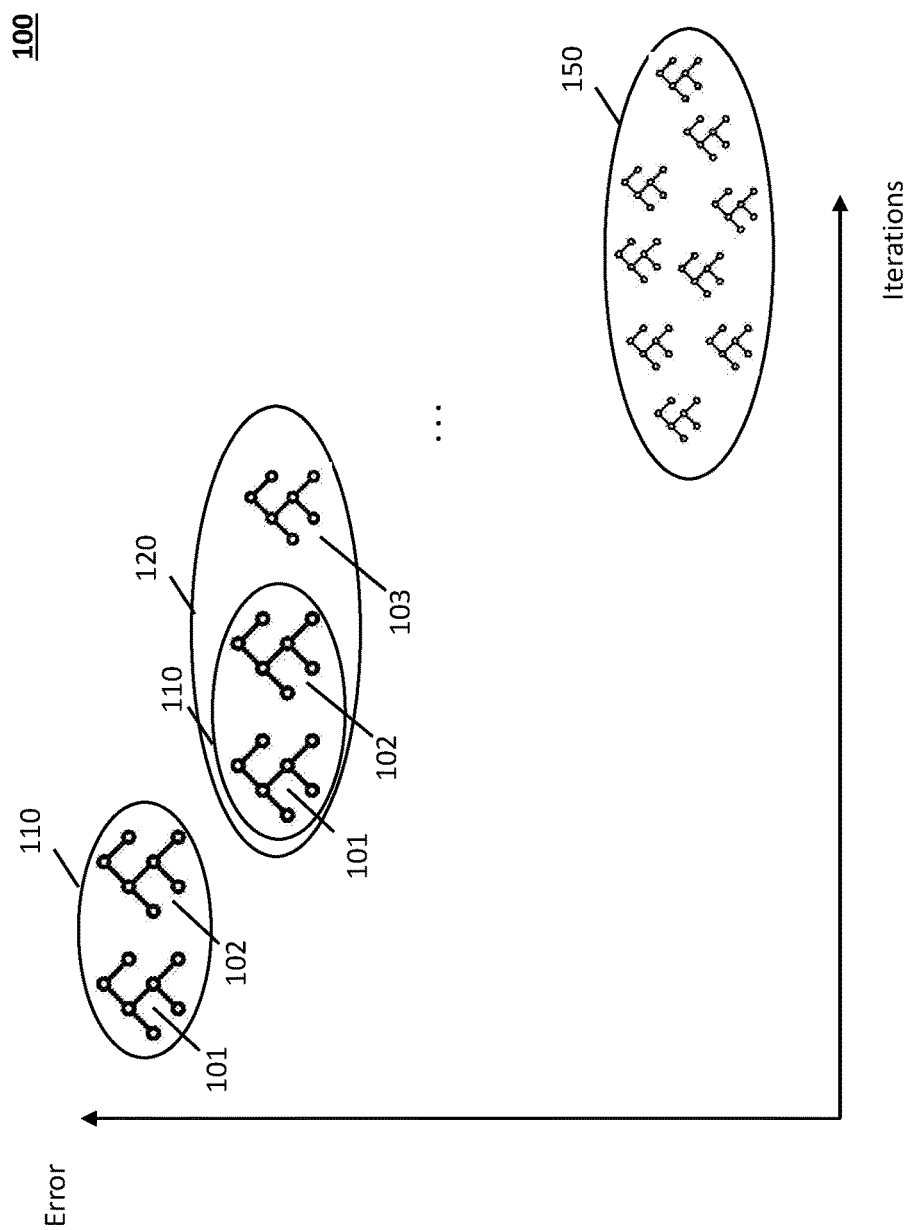
FIG. 1 depicts an operation of typical gradient boosted trees for machine learning.

Embodiments of the present invention facilitate implementing gradient boosted trees (GBT), which is a type of machine learning algorithm, in a data-parallel manner. GBT is a commonly used type of machine learning algorithm that relies on ensemble methods. Supervised learning algorithms are used for searching through a hypothesis space to find a hypothesis that can be used to make predictions for a particular problem. Ensembles improve the performance of such learning algorithms by combining multiple hypotheses. Types of ensemble methods used for machine learning include sequential ensemble methods, parallel ensemble methods, homogeneous ensemble methods, and heterogeneous ensemble methods.

In sequential ensemble methods, there are sequentially generated base learners in which data dependency resides. Every newly generated base learner has some dependency on the behavior of a previous base learner. Training data that are mislabeled by the previous base learners carry increased weights in training a new base learner so as to improve the performance of the overall system. Here, "base learner" is an algorithm that is used for building base classifiers (e.g., decision trees). Many instances of the base learning algorithm are pooled (with their decisions combined) together to create a "strong" ensemble classifier/model. "Base learner" can also be referred to as "weak learner" in some cases.

In parallel ensemble methods, the base learner is generated in parallel order in which data dependency is not there. Every one of the base learners is generated independently, where generating a base learner can include determining one or more parameters associated with the base learner.

A homogeneous ensemble method is a combination of the same types of classifiers, but the parameters are different for each classifier. This makes the combined model work more precisely after the aggregation of results from each component model. In the homogeneous ensemble method, the decision function is the same for each component.

Finally, a heterogeneous ensemble method is a combination of different types of classifiers or machine learning models in which each classifier is built upon the same data. In a heterogeneous ensemble method, the decision function is different for the same training data. The overall result of the heterogeneous ensemble method can be carried out by combining all the results of each combined model, for example, using averaging, weighted averaging, and other such combination techniques.

Embodiments of the present invention facilitate improving the performance of sequential ensemble methods, such as GBT. The examples described herein describe the improvements using GBT, however other sequential ensemble methods may be improved using the features described herein in other embodiments of the present invention.

GBT is a machine learning technique for regression and classification problems, which produces a prediction model in the form of an ensemble of base prediction models, which are decision trees. It builds the model in a stage-wise fashion like other boosting methods do, and it generalizes them by allowing optimization of an arbitrary differentiable loss function. Gradient boosting combines base learners into a single strong learner in an iterative training process that forces the later built base learners to make up for errors made by earlier built base learners.

FIG. 1 depicts an operation of GBT machine learning according to existing techniques. In a first iteration, a predictive model 110 is generated using decision trees 101 and 102. In a subsequent iteration, a predictive model 120 is generated using the ensemble of the decision trees 101, 102, along with an additional decision tree 103. Using the additional decision tree 103 in the ensemble for the predictive model 120 reduces the bias, i.e., the error of the predictive model 120 in comparison to that of the predictive model 110. In the depicted example, additional iterations of the GBT algorithm result in a predictive model 150 that has a lower error than the predictive model 110 and the predictive model 120 using additional decision trees. Every iteration processes the entire dataset that is used for training by sampling the data to build each single decision tree 101, 102, 103. This tree is then validated against a test dataset, sampled from the dataset, to compute residue errors, i.e., bias, for that iteration. The residue is then used to train the next tree to reduce the ensemble error (boosting).

It is understood that the number of decision trees in each iteration, the number of iterations, the depth of decision trees, and other such depictions in FIG. 1 are exemplary and that such parameters can vary in other embodiments of the present invention. Typically, when constructing a model using GBT, the following values are adjusted for improvement of the accuracy of the model—a number of decision trees, a learning rate, and a maximum depth of each decision tree.

Widely used GBT implementations include xgBoost (open-source software) and LightGBM (open-source software), among others. GBT is a generalized algorithm that works for various differentiable loss functions and typically provides predictive scores that are better than some other machine learning algorithms. GBT can also handle the technical challenge of missing data that plagues machine learning algorithms, and as an added advantage, GBT can handle such missing data without imputation. However, GBT is computationally expensive, which is a technical challenge when implementing GBT.

Some existing implementations of GBT support parallel implementations for building decision trees. However, in such parallel implementation, every iteration builds only one tree per sample of the entire dataset. Data parallel and feature parallel implementation suffer from I/O and communication costs (each tree build requires a collective reduction operation).

Embodiments of the present invention address this technical challenge of computational expense of implementing GBT by using a variant of the data parallelism. In one or more embodiments of the present invention, the entire dataset is read in a partitioned manner, each partition being read by a distinct thread group. Further, each data partition creates a separate tree ensemble: the entire dataset is covered by multiple tree ensembles. The number of tree ensembles depends on the amount of parallelism. Further, for a thread-group, once a tree ensemble is built, the ensemble is evaluated using a validating dataset sampled from another data partition, to compute new residue. This tree ensemble is then augmented with new trees built using samples from the new data partition and the computed residue with the new data partition at each iteration. The process continues until every thread group has processed all data partitions.

According to one or more embodiments, each data partition is operated by a thread group. In one or more embodiments of the present invention, there are at least two types of communication patterns: move data partitions across thread groups, which facilitates intra-node parallelism; and move tree ensembles across thread groups, which facilitates inter-node distributed implementation. Either of these implementations can be used to implement GBT on multi-node processing units. A multi-node processing unit can include a single computer with multiple processor cores, multiple computers with single processor cores each, multiple computers with multiple processor cores each. Here, a processor core can be a core of a central processing unit (CPU), a graphics processing unit (GPU), or any other type of processing unit. Each processing unit can execute one or more threads, a "thread group."

The parallelized implementation using one or more embodiments of the present invention results in an ensemble of tree ensembles. The parallelized implementation using one or more embodiments of the present invention is independent of a library or software used for implementing the GBT. For example, training and validation components from the xgBoost, LightGBM, and/or other software can be used to implement the parallelized GBT described herein.

Figure 2:
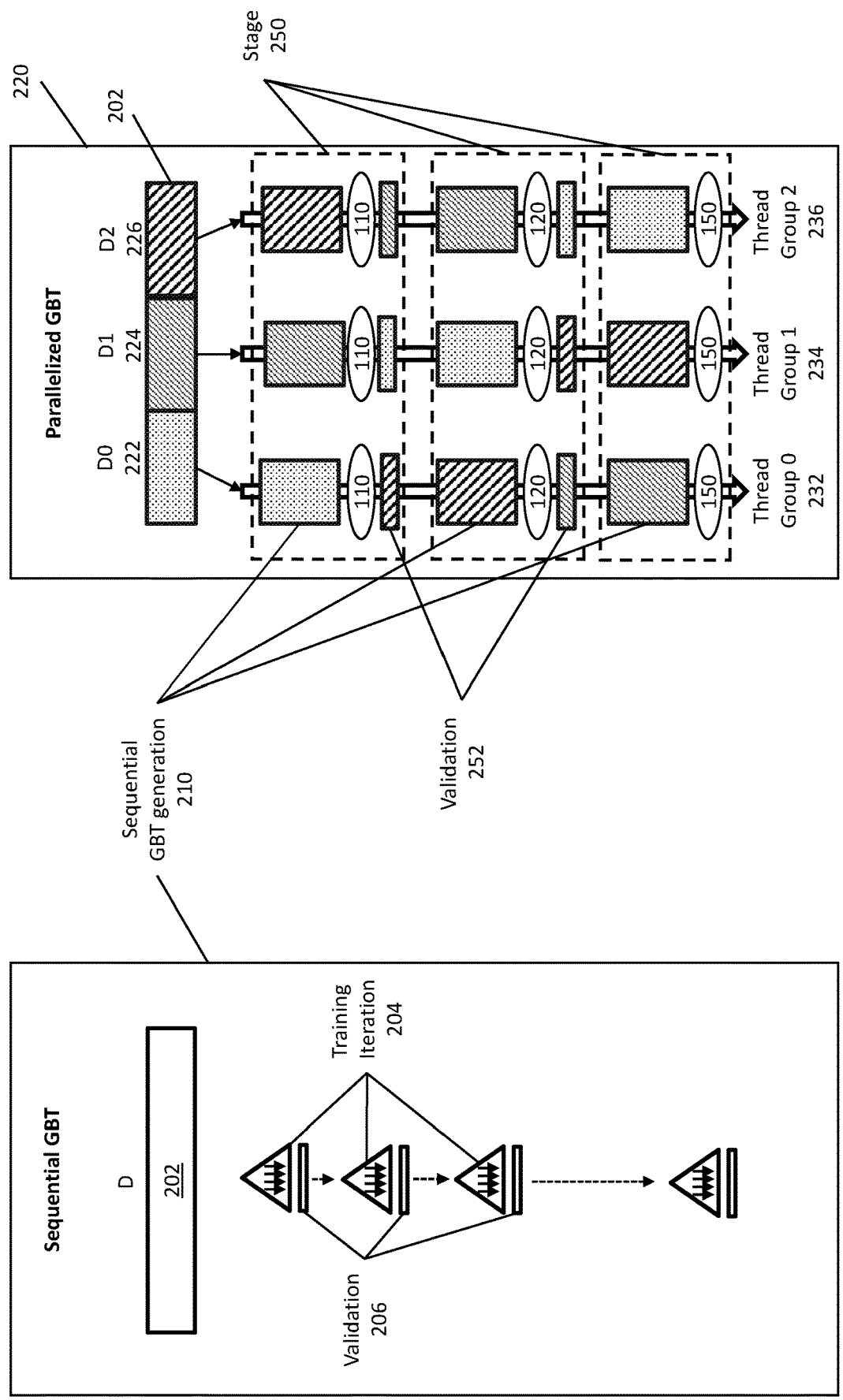
FIG. 2 depicts a parallelized implementation of gradient boosted trees according to one or more embodiments of the present invention.

FIG. 2 depicts a parallelized implementation of GBT according to one or more embodiments of the present invention. A sequential GBT 210 is also depicted for comparison. Generation of the GBT sequentially includes one or more iterations 204; each iteration 204 performed one after another. Each iteration 204 is followed by a corresponding validation 206. In one or more embodiments of the present invention, the corresponding validation 206 can be considered part of the iteration 204 itself. Each iteration 204 can include one or more machine learning operations to train an ensemble of decision trees. The validation 206 that is depicted is performed after all of the machine learning operations of the iteration 204 are performed.

In the existing sequential GBT 210, the dataset (D) 202 is used in each iteration 204 to generate one or more decision trees at each iteration. The sequential GBT 210 can include a predetermined number of iterations N. After each iteration 204, the validation 206 is performed to compute a residue, i.e., error, between a prediction of the generated decision trees in that iteration 204, and an actual result. The validation 206 is performed using a subset of the dataset 202. The subset used for validation 206 is selected by sampling the dataset 202. Thus, in the sequential GBT 210, the validation is performed using a subset of the same dataset 202 that was used for the generation of the decision trees.

Figure 3:
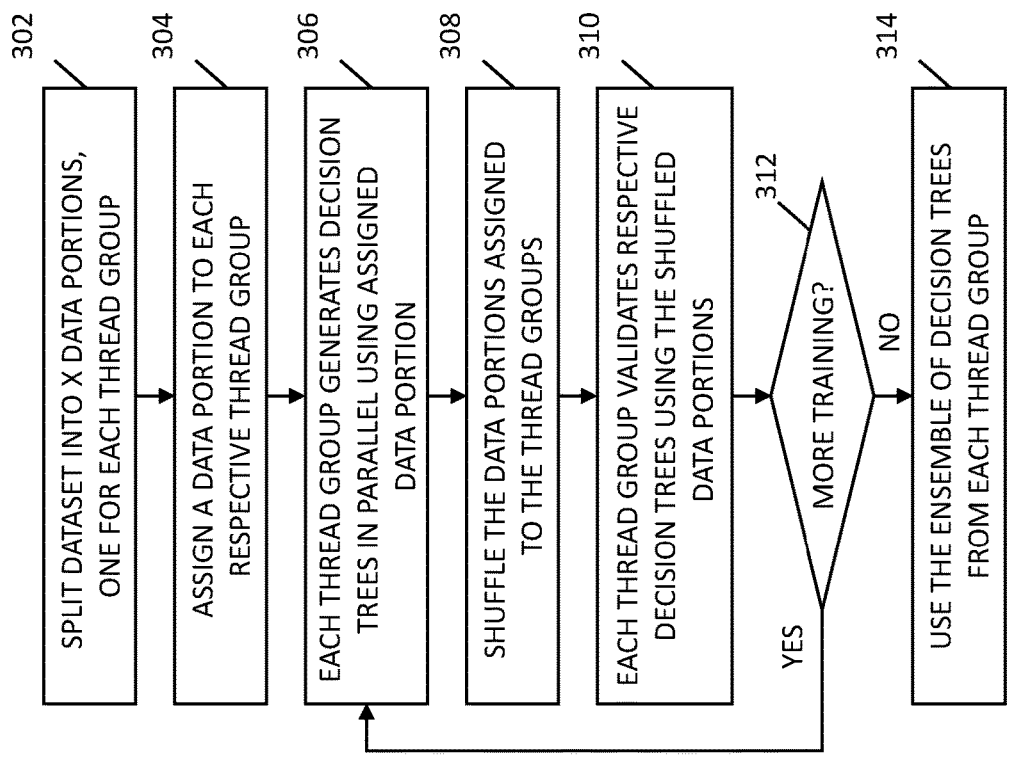
FIG. 3 depicts a flowchart of a method for a parallelized implementation of gradient boosted trees according to one or more embodiments of the present invention.

The parallelized GBT 220 is now described in conjunction with FIG. 3. FIG. 3 depicts a flowchart of a method 300 for a parallelized implementation of GBT according to one or more embodiments of the present invention. The method 300 includes splitting the dataset 202 into x data portions, one for each thread group, at block 302. In one or more embodiments of the present invention, there can be x thread groups. The number of thread groups can be a predetermined number based on the processor cores available. For example, if the parallel processing hardware on which the GBT is implemented, such as a GPU, CPU, or a combination thereof, each processor core of the parallel processing hardware can execute a respective thread group. Accordingly, a number of processor cores of the parallel processing hardware can determine the number of thread groups, and in turn, the number of portions into which the dataset 202 is divided. It is understood that the number of thread groups that can be executed can vary and can depend on factors other than the number of processor cores. Further, it is understood that the number of data portions x can be based on factors independent of the number of processor cores in one or more embodiments of the present invention.

FIG. 2 depicts the dataset 202 being split into three portions, D0 222, D1 224, and D2 226, and three thread groups implementing the parallelized GBT 220—thread group-0 232, thread group-1 234, and thread group-2 236.

Referring to the flowchart in FIG. 3, the method 300 further includes assigning each data portion 222, 224, 226 to respective thread groups 232, 234, 236, at block 304. For example, in the illustration of FIG. 2, the thread groups 232, 234, 236 are assigned data portions D0 222, D1 224, and D2 226, respectively. It is understood that the assignment can be different in other embodiments of the present invention. Assigning a data portion, say D0 222, to a thread group, say thread group-0 232, includes providing a pointer/reference of D0 222 to the processor that executes the thread group-0

232. The data portions 222, 224, and 226 can be stored in a shared memory that can be accessed by all of the thread groups 232, 234, 236.

At block 306, a stage 250 of training occurs, in which each of the thread groups 232, 234, 236 executes a sequence of iterations 204 of the GBT 210 to generate the first set of decision trees 110 using the respective assigned data portion 222, 224, 226. Each thread group executes in parallel. Each of the thread groups 232, 234, 236 generates the respective set of decision trees 110 using the known machine learning operations for the iterations 204 and subsequent validations 206 in the sequential GBT 210. The decision trees 110 generated by each of the thread groups 232, 234, 236 can be different from each other depending on the data encountered by each of the thread groups 232, 234, 236.

At block 308, the data portions 222, 224, 226 that are assigned to the thread groups 232, 234, 236 are shuffled. The shuffling includes assigning to each of the thread groups 232, 234, 236 a data portion that is different from the one that was used to generate the corresponding set of decision trees 110. For example, in the illustration of FIG. 2, the thread groups 232, 234, 236 are assigned data portions D2 226, D0 222, and D1 224, respectively, after the shuffling.

At block 310, each of the thread groups 232, 234, 236 validates (252) the respective sets of decision trees 110 using the data portions that are assigned after the shuffling. The thread groups 232, 234, 236 execute in parallel to perform validation 252 to validate the corresponding decision trees 110. Accordingly, the decision trees 110 are validated using data that was not used for generating the decision trees. For example, the thread group 0, in FIG. 2, generates the set of decision trees 110 using data portion D0 222, and validates the decision trees 110 using the data portion D2 226. The validation 252 is performed by each of the thread groups 232, 234, 236 in parallel using the known operations of validation used for GBT implementation.

At block 312, it is determined whether additional training is to be performed. Additional training may be required if the residue error computed during the validation 252 (block 310) does not meet a predetermined threshold. In one or more embodiments of the present invention, if the predetermined threshold is not satisfied by even one of the thread groups, additional training is performed by all of the thread groups. Alternatively, or in addition, additional training may be required if at least a predetermined minimum number of stages 250 (e.g., 3, 5, 10, etc.) have not been executed. The predetermined threshold and/or the minimum number of stages 250 can be configurable values in one or more embodiments of the present invention.

If additional stages 250 are to be performed, the method 300 generates additional decision trees (set 120, set 150, etc.) by executing additional stages 250 by the thread groups 232, 234, 236, at block 306. The data portions that are assigned to each of the thread groups 232, 234, 236 are shuffled, and the decision trees are again validated using the shuffled data portions, as described earlier. These operations are repeated until additional training is deemed not required (at block 312).

Once all the required stages 250 are performed, the resulting decision trees 150 from each of the thread groups 232, 234, 236 during the last executed stage 250 are used as the resulting ensemble of decision trees of the GBT, at block 314. Each of the thread groups 232, 234, 236 generates its respective ensemble (set) of decision trees 150. Collectively, all of the sets of decision trees 150, from each of the thread groups 232, 234, 236 provide the final ensemble of decision trees. At inference time, the decisions by each member of the ensemble are combined with a voting function to yield the final decision.

Figure 4:
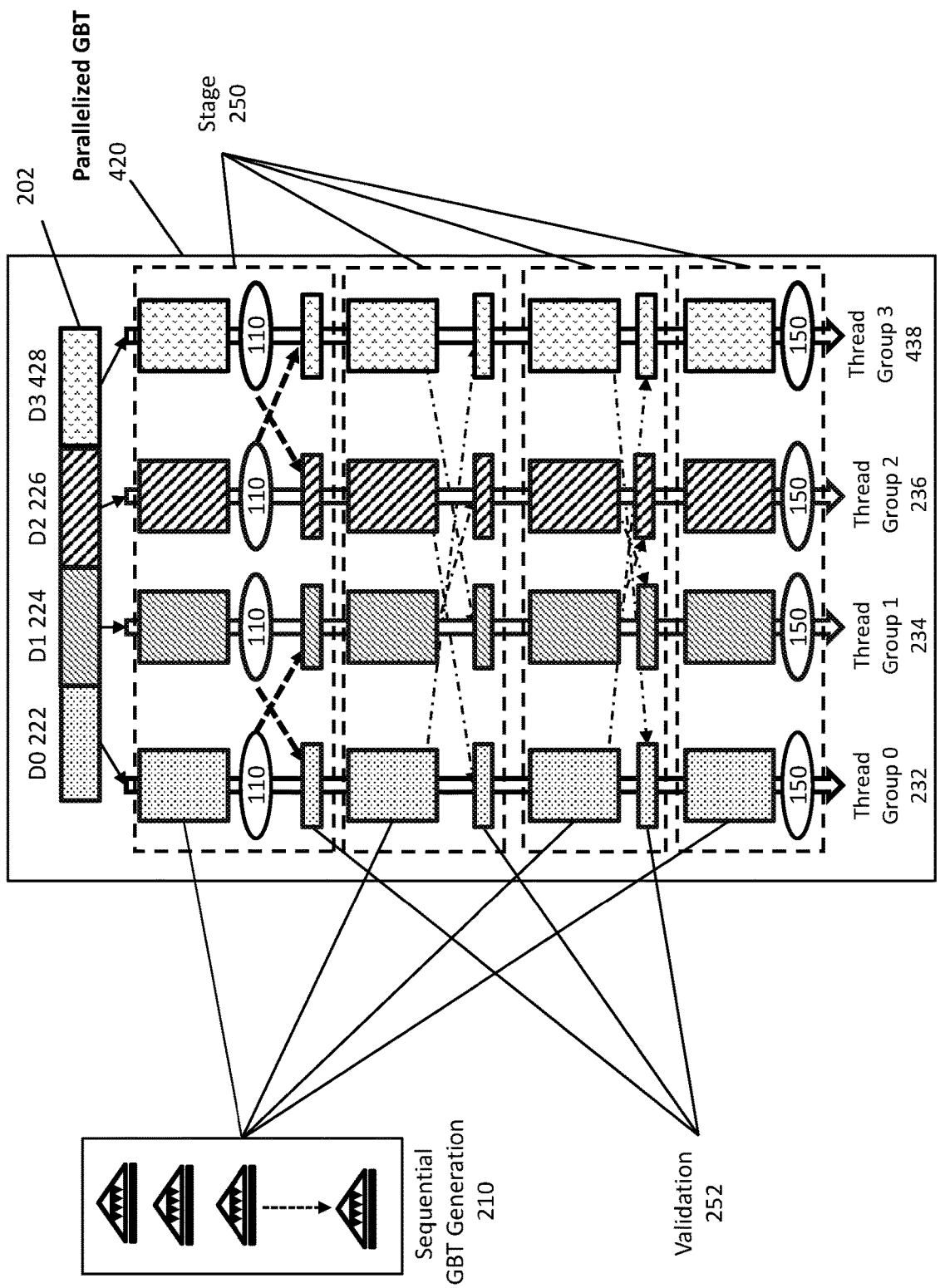
FIG. 4 depicts a parallelized implementation of gradient boosted trees according to one or more embodiments of the present invention.
Figure 5:
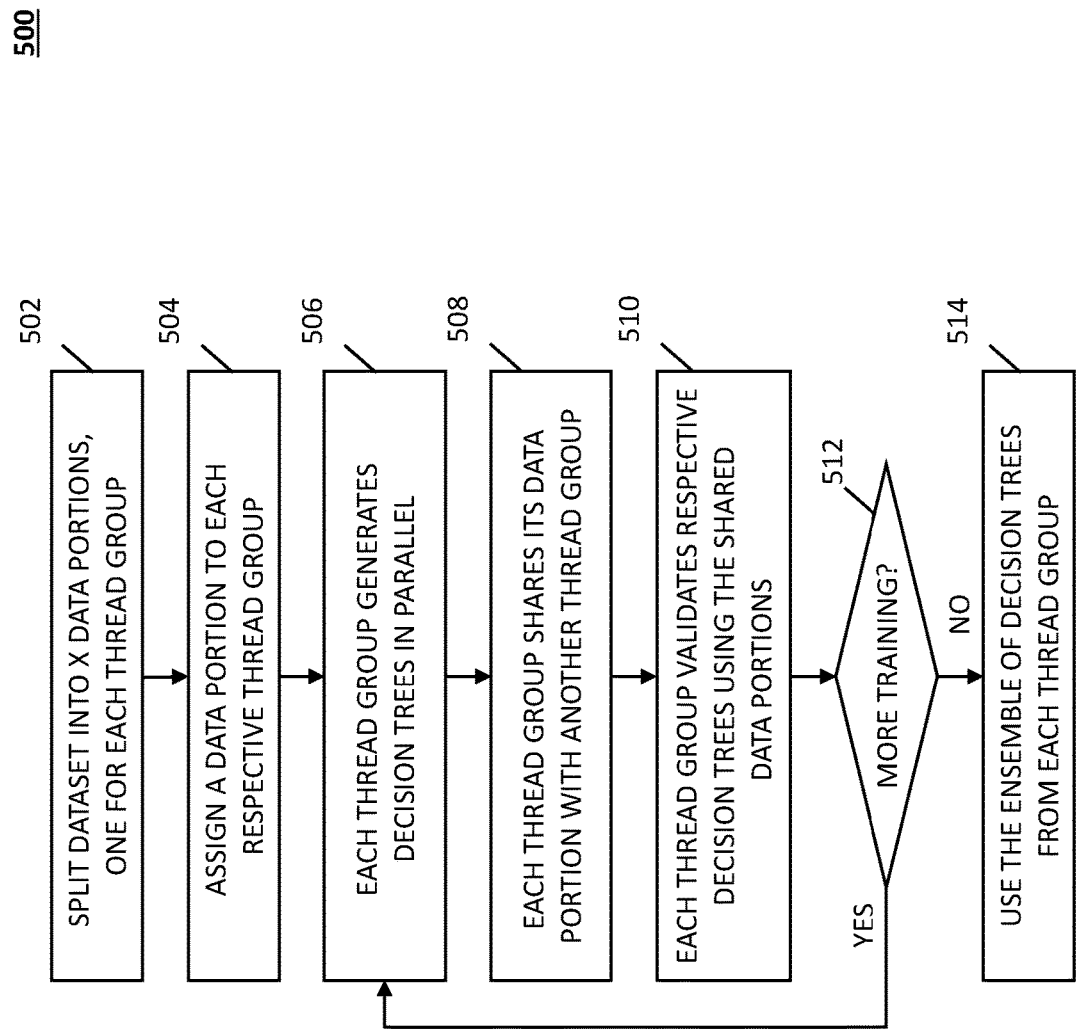
FIG. 5 depicts a flowchart of a method for a parallelized implementation of gradient boosted trees according to one or more embodiments of the present invention.

FIG. 4 depicts another parallelized implementation of GBT according to one or more embodiments of the present invention. The parallelized GBT 420 is now described in conjunction with FIG. 5. FIG. 5 depicts a flowchart of a method 500 for a parallelized implementation of GBT 420 according to one or more embodiments of the present invention. The method 500 includes splitting the dataset 202 into x data portions, one for each thread group, at block 502. As described earlier, the number of data portions x can be dependent on, for example, be the same as the number of thread groups. Alternatively, the number of data portions x can be dependent on, for example, be the same as the number of processor cores available for implementing the parallelized GBT 420. Alternatively, the number of data portions x can be based on factors independent of the number of thread groups and/or processor cores in one or more embodiments of the present invention.

FIG. 4 depicts the dataset 202 being split into four portions, D0 222, D1 224, D2 226, and D3 428. Further, FIG. 4 depicts four thread groups implementing the parallelized GBT 420—thread group-0 232, thread group-1 234, thread group-2 236, and thread group-4 438.

Referring to the flowchart in FIG. 5, the method 500 further includes assigning each data portion 222, 224, 226, 428 to respective thread groups 232, 234, 236, 438 at block 504. For example, in the illustration of FIG. 4, the thread groups 232, 234, 236, 438 are assigned data portions D0 222, D1 224, D2 226, and D3 428, respectively. It is understood that the assignment can be different in other embodiments of the present invention. Assigning a data portion, say D0 222, to a thread group, say thread group-0 232, includes providing a pointer/reference of D0 222 to the processor that executes the thread group-0 232. The data portions D0 222, D1 224, D2 226, and D3 428 can be stored in a shared memory that can be accessed by all of the thread groups 232, 234, 236, 438.

At block 506, a stage 250 of training occurs, in which each of the thread groups 232, 234, 236 executes in parallel to complete a sequential GBT generation 210 to build a corresponding set of decision trees using the respectively assigned data portions 222, 224, 226, 428. The decision trees 110 generated by each of the thread groups 232, 234, 236, 438 can be different from each other depending on the data encountered by each of the thread groups 232, 234, 236, 438.

At block 508, each of the thread groups 232, 234, 236, 438 shares the data portion assigned to that particular thread group with another thread group. For example, as depicted in FIG. 4, the thread group-0 232 shares its data portion D0 222 with the thread group-1 234, which in turn shares its data portion D1 224 with another thread group, in this case the thread group-0 222. It is understood that the thread groups 232, 234, 236, 438 can share their respective data portions in a different manner than what is shown in FIG. 4.

In one or more embodiments of the present invention, a first thread group "shares" a first data portion that is assigned to it, with a second thread group by providing a reference/pointer of the data portion. Because the first data portion is in a shared memory, the second thread group can now access the first data portion using the reference. Any other manner of sharing the data from the first data portion with the second thread group can be used in other embodiments.

At block 510, each of the thread groups 232, 234, 236, 438 validates (252) the respective sets of decision trees 110 using the data portions that are shared from another thread group. The thread groups 232, 234, 236, 438 execute in parallel to perform validation 252 to validate the corresponding decision trees 110. Accordingly, the decision trees 110 are validated using data that was not used for generating the decision trees. For example, the thread group 0, in FIG. 4, generates the set of decision trees 110 using data portion D0 222 and validates the decision trees 110 using the data portion D2 226. The validation 252 is performed by each of the thread groups 232, 234, 236, 438 in parallel using the known operations of validation used for GBT implementation.

At block 512, it is determined whether additional training is to be performed. Additional training may be required if the residue error computed during the validation 252 (block 510) does not meet a predetermined threshold. In one or more embodiments of the present invention, if the predetermined threshold is not satisfied by even one of the thread groups, additional training is performed by all of the thread groups. Alternatively, or in addition, additional training may be required if at least a predetermined minimum number of stages 250 (e.g., 3, 5, 10, etc.) have not been executed. The predetermined threshold and/or the minimum number of stages 250 can be configurable values in one or more embodiments of the present invention.

If additional stages 250 are to be performed, the method 500 generates additional decision trees (set 120, set 150, etc.) by executing additional stages 250 by the thread groups 232, 234, 236, 438 at block 506. The data portions that are assigned to each of the thread groups 232, 234, 236, 438 are shared, and the decision trees are again validated using the shared data portions, as described earlier. In one or more embodiments of the present invention, each of the thread groups 232, 234, 236, 438 shares its data portion with a thread group different from the thread group shared in a previous iteration. For example, in FIG. 4, after a first iteration, the thread group-0 232 shares the data portion D0 222 with the thread group-1 234; after a second iteration, the thread group-0 232 shares the data portion D0 222 with the thread group-2 236; and after a third iteration the thread group-0 232 shares the data portion D0 222 with the thread group-3 438. It is understood that the order in which a thread group shares its data portion with the other thread groups can vary in other embodiments of the present invention. Each of the thread groups 232, 234, 236, 438 use the respective data portions 222, 224, 226, 428 that were initially assigned to generate the decision trees at every stage 250. These operations are repeated until additional training is deemed not required (at block 512).

Once all the required stages 250 are performed, the resulting decision trees 150 from each of the thread groups 232, 234, 236, 438 during the last executed stage 250 are used as the resulting ensemble of decision trees of the GBT, at block 514. Each of the thread groups 232, 234, 236, 438 generates its respective ensemble (set) of decision trees 150. Collectively, all of the sets of decision trees 150, from each of the thread groups 232, 234, 236, 438 provide the final ensemble of decision trees. At inference time, the decisions by each member of the ensemble are combined with a voting function to yield the final decision.

It can be seen from the foregoing detailed description that embodiments of the invention provide technical effects and benefits. Embodiments of the present invention improve GBT implementation and accordingly provide an improvement to computing technology in a practical application. Advantages of the parallelized implementation of the GBT according to one or more embodiments of the present invention include parallelizing data reading. Further, each thread group operates on a smaller dataset by splitting the dataset into data portions, which results in requiring fewer operations for generating the final ensemble of trees. Further, the communication between thread groups is a point-to-point data transfer, unlike collective communication required in the traditional data parallel implementation. The amount of data communicated in a point-to-point data transfer is smaller than in the collective communication. Therefore, such a point-to-point data transfer facilitates faster execution of the parallelized GBT according to one or more embodiments of the present invention.

Embodiments of the present invention are hardware agnostic and can be implemented using any type of parallel programmable hardware such as CPU, GPU, etc., or a combination thereof.

Additionally, each thread group processes the entire dataset, but in a different order, giving each thread group coverage over the entire dataset. Also, the final ensemble of decision trees (150) includes groups of trees that are distinct from each other by the order they leverage the data partitions and hence has a greater diversity in structure compared to the ensemble of trees generated and validated using the same dataset as a whole.

Embodiments of the present invention, accordingly, improve the GBT implementation by providing I/O and compute parallelism, coverage over the entire dataset, and diversity in structure.

Embodiments of the present invention facilitate a data-parallel ensemble building process for gradient boosted trees. An entire training dataset is partitioned into N subsets, each hosted by a node in a distributed computing system, the node corresponding to a thread group. A boosting based classifier is trained at each node with an in-node data subset. In one or more embodiments of the present invention, once the classifier models are completely trained at each node, they are moved to a nearby node and resume training with newly exposed data, after a sufficient number, K, of shuffling passes, the resulting classifiers, each with partial (or total if K=N) training data exposure are combined as an ensemble. At inference time, the decisions by each member of the ensemble are combined with a voting function to yield the final decision using the ensemble of decision trees thus trained.

Figure 6:
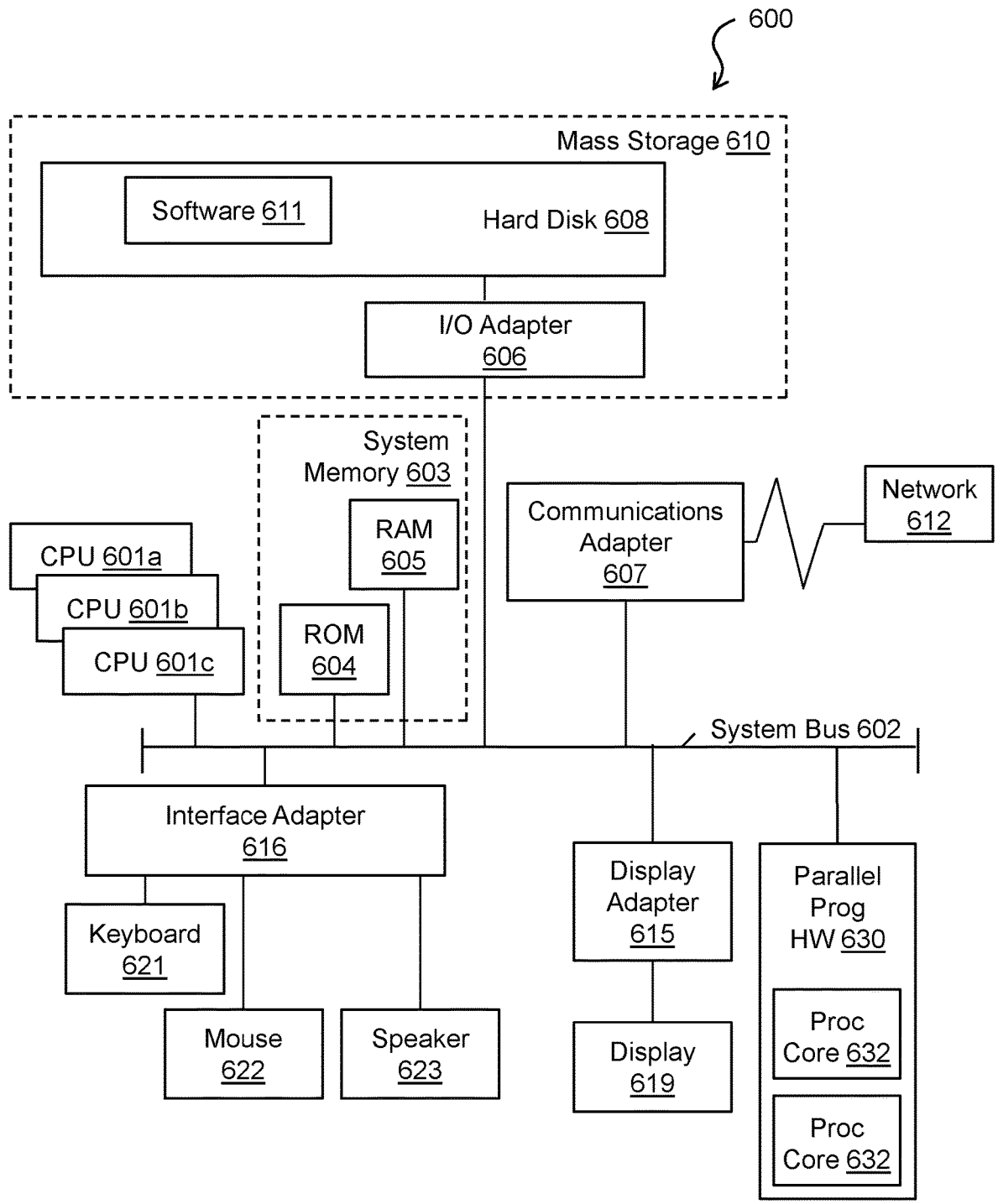
FIG. 6 depicts a computer system that implements one or more embodiments of the present invention.

Turning now to FIG. 6, a computer system 600 is generally shown in accordance with an embodiment. The computer system 600 can be used to implement one or more parallelized GBT implementations described herein. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random-access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

In some embodiments, the computing system 600 includes a parallel programmable hardware, such as a GPU, FPGA, or any other hardware component that includes one or more processor cores 632 that can execute thread groups in parallel. The CPU 601a, 601b, 601c can control the execution of the thread groups on the parallel programmable hardware 630. Alternatively, or in addition, the CPU 601a, 601b, 601c can execute one or more thread groups in conjunction with the parallel programmable hardware 630.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

In one or more embodiments of the present invention, the parallelized GBT implementation, and other machine learning techniques can be implemented using cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
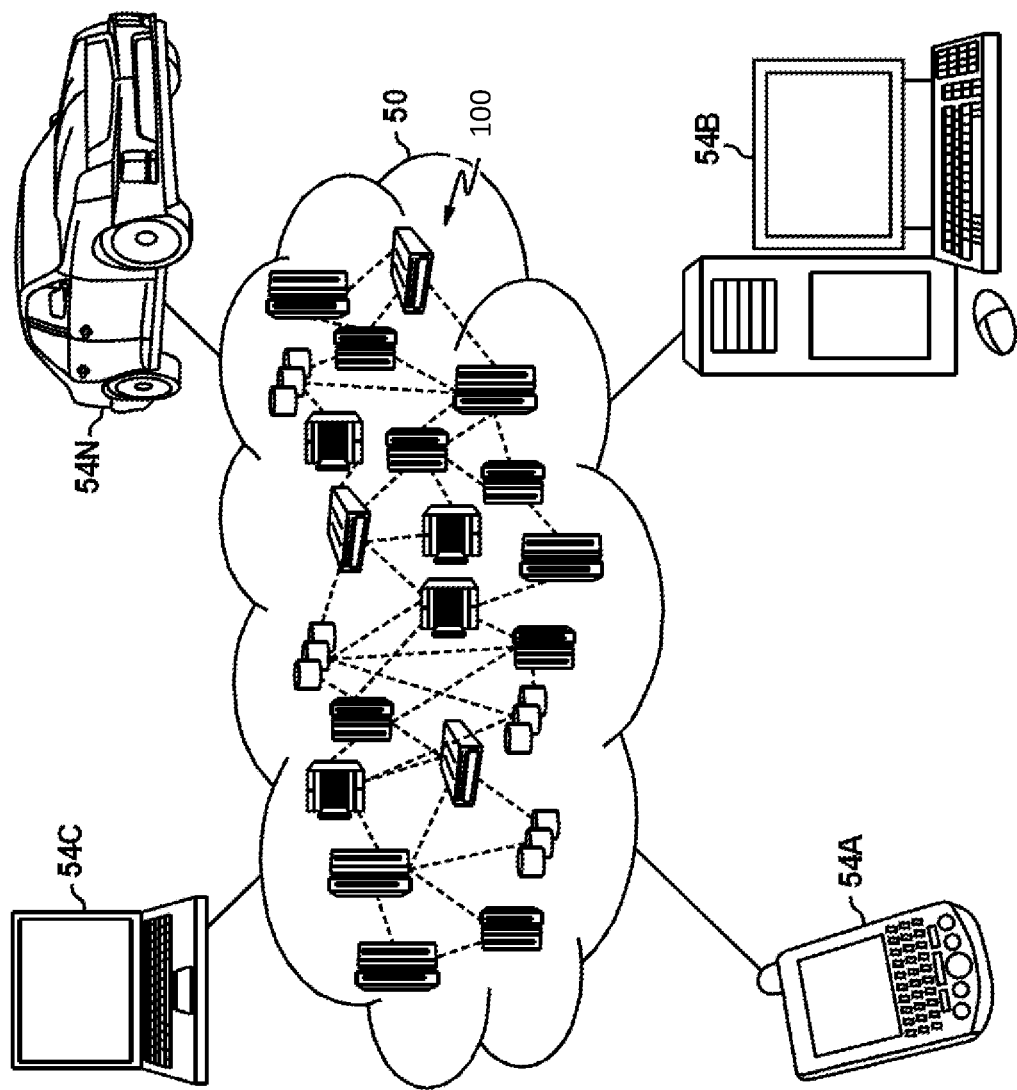
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
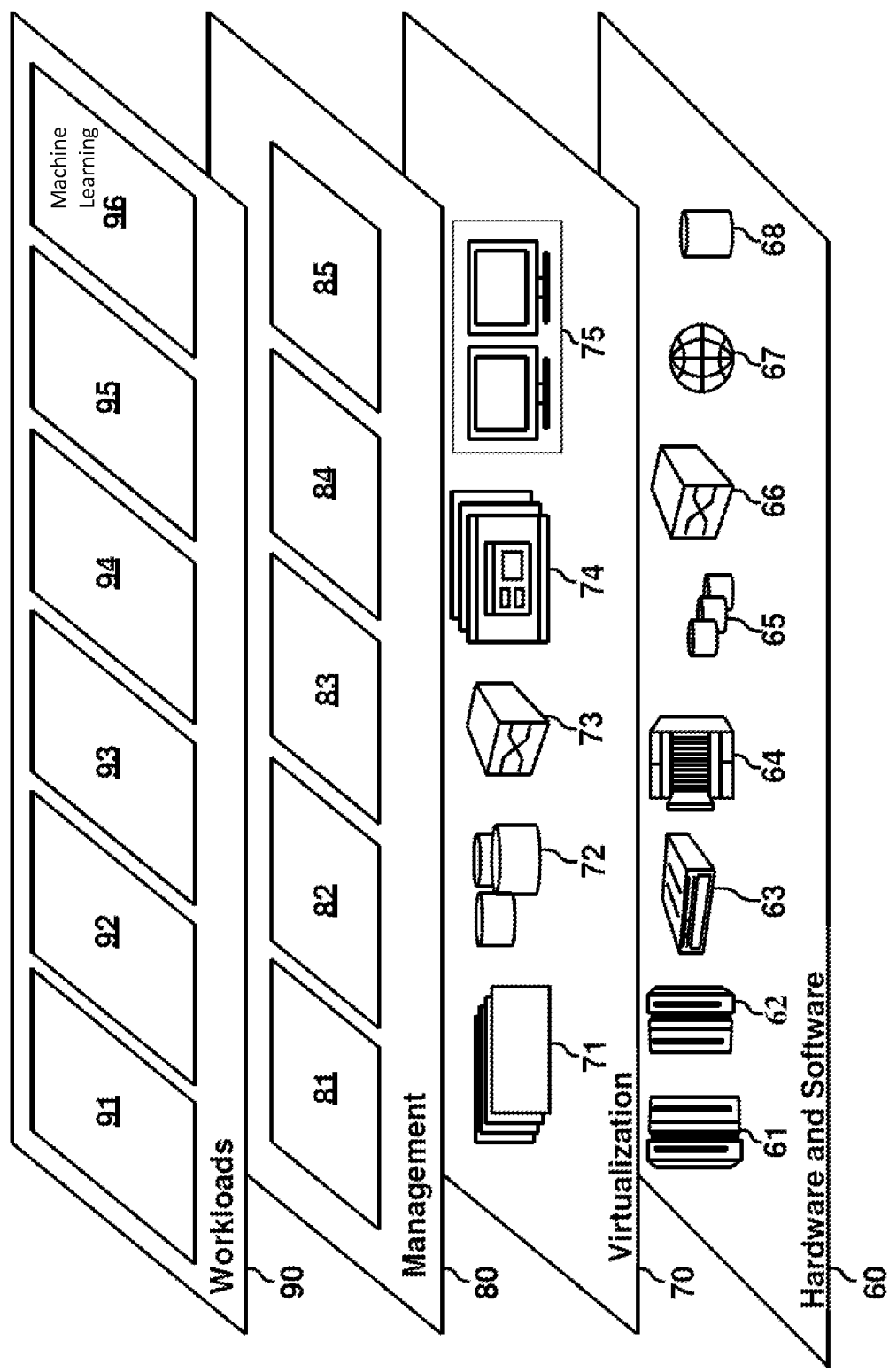
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning 96. The machine learning layer 96 can facilitate implementing GBT in a parallelized manner according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for data-parallel ensemble training using gradient boosted trees, the computer-implemented method comprising:
   training, using a machine learning device, an ensemble of trees using gradient boosted trees, the training comprising:

splitting a training dataset into a plurality of data portions;

assigning a data portion to each thread group from a plurality of thread groups;

executing a stage, in which each thread group, in parallel, trains a respective ensemble of decision trees, wherein the stage comprises:

performing, by each thread group, in parallel, machine learning operations for the respective ensemble of decision trees using the data portion assigned to each thread group respectively; and validating, by each thread group, in parallel, the respective ensemble of decision trees using a data portion assigned to another thread group;

repeating execution of the stage until a predetermined threshold is satisfied; and inferencing, by the machine learning device, a prediction using the ensemble of decision trees that comprises the respective ensemble of trees from each of the thread groups, wherein a first thread group shares, with a second thread group, a reference of a first data portion that is assigned to said first thread group for the second thread group to perform validation after a first stage.

2. The computer-implemented method of claim 1, wherein each of the thread groups is executed by a respective processor core.

3. The computer-implemented method of claim 1, wherein the first thread group shares, with a third thread group, the reference of the first data portion that is assigned to said first thread group for the third thread group to perform validation after a second stage.

4. The computer-implemented method of claim 1, wherein the data portions assigned to each of the thread groups are shuffled prior to the validating after each training.

5. The computer-implemented method of claim 1, wherein a number of the data portions is equal to a number of the thread groups.

6. The computer-implemented method of claim 1, wherein the data portions are stored in a shared memory that is accessible by each of the thread groups.

7. A system comprising:

a memory having computer readable instructions; and one or more processors for executing the computer readable instructions, the computer readable instructions controlling the one or more processors to perform data-parallel ensemble training for gradient boosted trees, the computer-implemented method comprising:

training an ensemble of trees using gradient boosted trees, the training comprising:

splitting a training dataset into a plurality of data portions;

assigning a data portion to each thread group from a plurality of thread groups;

executing a stage, in which each thread group, in parallel, trains a respective ensemble of decision trees, wherein the stage comprises:

performing, by each thread group, in parallel, machine learning operations for the respective ensemble of decision trees using the data portion assigned to each thread group respectively; and validating, by each thread group, in parallel, the respective ensemble of decision trees using a data portion assigned to another thread group;

repeating execution of the stage until a predetermined threshold is satisfied; and repeating the iteration, by each thread group, in parallel, until a predetermined threshold is satisfied, wherein a prediction is inferenced using the ensemble of decision trees that comprises the respective ensemble of trees from each of the thread groups, wherein a first thread group shares, with a second thread group, a reference of a first data portion that is assigned to said first thread group for the second thread group to perform validation after a first stage.

8. The system of claim 7, wherein each of the thread groups is executed by a respective processor core.

9. The system of claim 7, wherein the first thread group shares, with a third thread group, the reference of the first data portion that is assigned to said first thread group for the third thread group to perform validation after a second stage.

10. The system of claim 7, wherein the data portions assigned to each of the thread groups are shuffled prior to the validating after each training.

11. The system of claim 7, wherein the number of data portions is equal to the number of thread groups.

12. The system of claim 7, wherein the data portions are stored in a shared memory that is accessible by each of the thread groups.

13. A computer program product comprising a computer readable storage medium having program instructions embodied therewith, the program instructions executable by one or more processors to cause the one or more processors to perform data-parallel ensemble building for gradient boosted trees, the computer-implemented method comprising:

training an ensemble of trees using gradient boosted trees, the training comprising:

splitting a training dataset into a plurality of data portions;

assigning a data portion to each thread group from a plurality of thread groups;

executing a stage, in which each thread group, in parallel, trains a respective ensemble of decision trees, wherein the stage comprises:

performing, by each thread group, in parallel, machine learning operations for the respective ensemble of decision trees using the data portion assigned to each thread group respectively; and validating, by each thread group, in parallel, the respective ensemble of decision trees using a data portion assigned to another thread group;

repeating execution of the stage until a predetermined threshold is satisfied; and inferencing a prediction using the ensemble of decision trees that comprises the respective ensemble of trees from each thread group, wherein a first thread group shares, with a second thread group, a reference of a first data portion that is assigned to said first thread group for the second thread group to perform validation after a first stage.

14. The computer program product of claim 13, wherein each of the thread groups is executed by a respective processor core.

15. The computer program product of claim 13, wherein the data portions assigned to each of the thread groups are shuffled prior to the validating after each training.

16. The computer program product of claim 13, wherein the number of data portions is equal to the number of thread groups.

17. The computer program product of claim 13, wherein the data portions are stored in a shared memory that is accessible by each of the thread groups.

* * * * *